Feb. 9, 1943.      C. A. DUKE      2,310,733
INTERNAL COMBUSTION ENGINE
Filed March 25, 1942    2 Sheets-Sheet 1
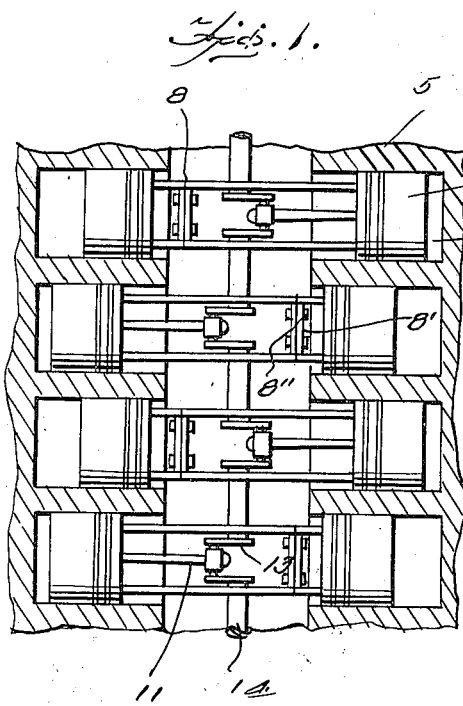
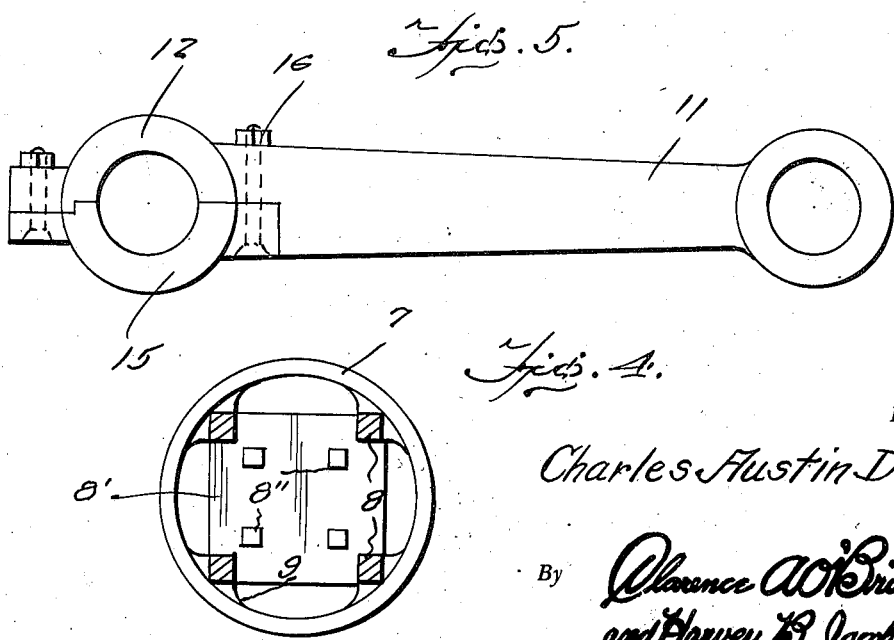
Inventor
Charles Austin Duke
By Clarence A. O'Brien
and Harvey B. Jacobson
Attorneys Feb. 9, 1943.  C. A. DUKE  2,310,733
INTERNAL COMBUSTION ENGINE
Filed March 25, 1942   2 Sheets-Sheet 2

Inventor
Charles Austin Duke

By Clarence A. O'Brien
and Harvey B. Jacobson
Attorneys ced power pistons in the cylinders for simulta-
UNITED STATES PATENT OFFICE 2,310,733

INTERNAL COMBUSTION ENGINE

Charles Austin Duke, San Antonio, Tex.

Application March 25, 1942, Serial No. 436,206

1 Claim. (Cl. 123—56)

The present invention relates to new and useful improvements in internal combustion engines and more particularly to an engine having opposed cylinders and providing rigidly connected power pistons in the cylinders for simultaneous actuation and employing a single connecting rod for connecting each pair of pistons to the crankshaft.

A further object is to provide a piston construction for engines which is strong and durable, which tends to reduce wear on the cylinder walls as well as on the pistons, which at the same time permits economy in the construction of the pistons by reducing the length of the skirt portion thereof and which at the same time is otherwise well adapted for the purposes for which the same is intended.

Other objects and advantages reside in the details of construction as more fully hereinafter described and claimed, reference being had to the accompanying drawings forming hereof, wherein like numerals refer to like parts throughout and in which:

Figure 1 is a fragmentary sectional view through an engine showing the pistons connected in pairs for working in the cylinders.

Figure 4 is a transverse sectional view through the rod connecting a pair of the pistons, and Figure 5 is a plan view of one of the connecting rods for the pistons and crankshaft.

Figure 2:
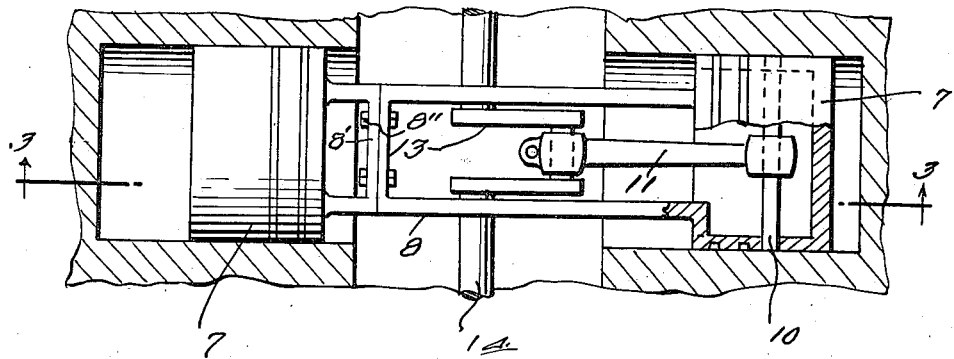
Figure 2 is a similar view showing a pair of the pistons and with parts broken away and shown in section.
Figure 3:
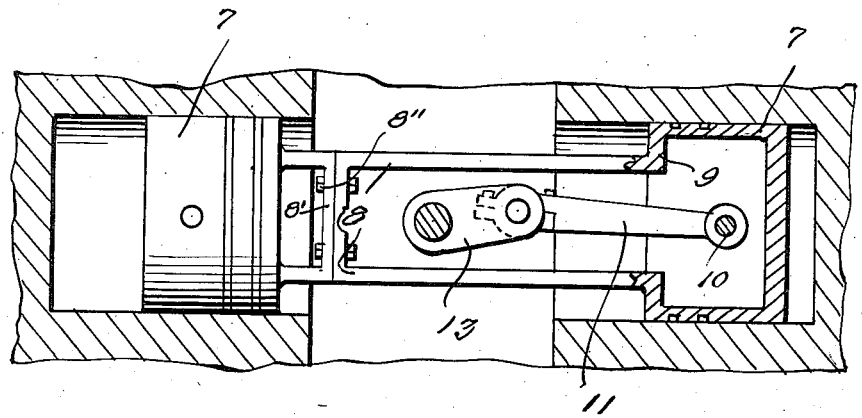
Figure 3 is a sectional view taken substantially on a line 3—3 of Figure 2.

Referring now to the drawings in detail, wherein for the purpose of illustration I have disclosed a preferred embodiment of the invention, the numeral 5 designates a portion of the engine having the opposed cylinders 6 formed therein to provide the usual combustion chambers having conventional means (not shown) for feeding to the cylinders, igniting the same, and exhausting the products of combustion therefrom.

Power pistons 7 are provided for each of the cylinders, the pistons being arranged in pairs and are provided with a plurality of rods 8 extending in parallel relation and rigidly connected to the skirt portions of the pistons by web members 9. The web members 9 project inwardly of the skirt portions of the pistons to space the rods 8 from the walls of the cylinder.

The rods of one piston are relatively short while the rods of its opposed piston are relatively long and the adjacent ends of the rods are provided with plates 8' connected together by bolts 8''.

Each piston having the long rods is provided with a wrist pin 10 to which one end of a connecting rod 11 is pivotally attached, the other end of the connecting rod being provided with a split bearing 12 for detachable connection with the crank 13 of the crankshaft 14. The removable section 15 of the split bearing 12 is secured in position by means of bolts and nuts 16.

As illustrated in Figure 1 of the drawings, the pistons having the connecting rod 11 attached thereto are alternately arranged at opposite sides of the engine to balance the force of the power stroke delivered to the crankshaft.

By rigidly connecting each pair of pistons in the manner indicated, it is possible to construct the pistons with a shorter skirt portion by reason of the fact that one piston acts as a guide for the other piston and no play is possible between the sides of the pistons and the sides of the cylinder walls, thereby reducing wear on such parts.

It is believed the details of construction, and advantages of the invention will be readily understood from the foregoing without further detailed explanation.

Having thus described the invention what I claim is:

An internal combustion engine comprising opposed cylinders, pistons working in the cylinders, lugs in the pistons, rigid rods projecting from the lugs, plates on the ends of the rods, and disposed in abutting relation, and bolts connecting the plates.

CHARLES AUSTIN DUKE.